United States Patent
Zhou (10) Patent No.: US 9,865,063 B2
(45) Date of Patent: Jan. 9, 2018

(54) METHOD AND SYSTEM FOR IMAGE FEATURE EXTRACTION

(71) Applicant: Alibaba Group Holding Limited, George Town (KY)

(72) Inventor: Chunyi Zhou, Hangzhou (CN)

(73) Assignee: Alibaba Group Holding Limited (KY)

( * ) Notice: Subject to any disclaimer, the term of this patent is extended or adjusted under 35 U.S.C. 154(b) by 81 days.

(21) Appl. No.: 13/944,677

(22) Filed: Jul. 17, 2013

(65) Prior Publication Data

US 2013/0301914 A1     Nov. 14, 2013

Related U.S. Application Data

(63) Continuation of application No. 12/658,471, filed on Feb. 9, 2010, now Pat. No. 8,515,178.

(30) Foreign Application Priority Data

Feb. 13, 2009  (CN) .......................... 2009 1 0007218

(51) Int. Cl.
| | | |
|---|---|---|
| *G06K 9/00* | (2006.01) | |
| *G06T 7/00* | (2017.01) | |
| *G06T 7/12* | (2017.01) | |
| *G06T 7/136* | (2017.01) | |

(52) U.S. Cl.
CPC .............. *G06T 7/0083* (2013.01); *G06T 7/12* (2017.01); *G06T 7/136* (2017.01)

(58) Field of Classification Search
None
See application file for complete search history.

(56) References Cited

U.S. PATENT DOCUMENTS

| | | | |
|---|---|---|---|
| 6,181,838 B1* | 1/2001 | Knowlton | G06F 17/30873 382/305 |
| 7,251,364 B2 | 7/2007 | Tomita et al. | |
| 2003/0009670 A1* | 1/2003 | Rhoads | G06T 1/0021 713/176 |
| 2003/0103650 A1* | 6/2003 | Otsuka | G06K 9/00798 382/104 |
| 2006/0067592 A1 | 3/2006 | Walmsley et al. | |

(Continued)

FOREIGN PATENT DOCUMENTS

| | | |
|---|---|---|
| JP | H03-034880 | 2/1991 |
| JP | H05210736 | 8/1993 |

(Continued)

*Primary Examiner* — Fred Hu
(74) *Attorney, Agent, or Firm* — Van Pelt, Yi & James LLP (57) ABSTRACT

Image feature extraction includes extracting an cutout image that includes an object from an original image; filling borders of the cutout image with a single color as a background to generate a minimum square image; resizing the minimum square image into a resized square image having a first predetermined size; dividing the resized square image into sub-image blocks having a second predetermined size; computing luminosity derivatives of neighboring pixels in horizontal, vertical, positive 45°, and negative 45° directions for the sub-image blocks; obtaining a quintuplet characteristic vector for the sub-image block; and forming an image characteristic vector of the original image using the quintuplet characteristic vectors of the sub-image blocks.

20 Claims, 9 Drawing Sheets

(56) References Cited

U.S. PATENT DOCUMENTS

| | | |
|---|---|---|
| 2006/0210170 A1 | 9/2006 | Yumoto et al. |
| 2008/0095466 A1* | 4/2008 | Kinrot ................... G06T 1/0007 382/284 |
| 2009/0009670 A9* | 1/2009 | Chono .................. F15B 21/065 349/33 |
| 2009/0028432 A1* | 1/2009 | Rossato .................. G06T 7/194 382/173 |
| 2010/0002002 A1 | 1/2010 | Lipsky et al. |
| 2010/0150440 A1 | 6/2010 | Kwak et al. |
| 2011/0164823 A1* | 7/2011 | Park ........................ G06T 7/194 382/199 |

FOREIGN PATENT DOCUMENTS

| | | | |
|---|---|---|---|
| JP | 2003122758 | 3/1998 | |
| JP | 2000137788 | 5/2000 | |
| JP | 2001319232 | 11/2001 | |
| JP | 2008269182 | 11/2008 | |
| WO | WO 2009031751 A1 * | 3/2009 | ............... G06T 7/12 |
| WO | WO2009031751 A1 * | 3/2009 | ........... G06T 7/0083 |

* cited by examiner

| 1 | 2 | 3 | 4 | 5 | 6 |
|---|---|---|---|---|---|
| 7 | 8 | 9 | 10 | 11 | 12 |
| 13 | 14 | 15 | 16 | 17 | 18 |
| 19 | 20 | 21 | 22 | 23 | 24 |
| 25 | 26 | 27 | 28 | 29 | 30 |
| 31 | 32 | 33 | 34 | 35 | 36 |

METHOD AND SYSTEM FOR IMAGE FEATURE EXTRACTION

This application is a continuation of co-pending U.S. patent application Ser. No. 12/658,471, entitled METHOD AND SYSTEM FOR IMAGE FEATURE EXTRACTION filed Feb. 9, 2010 which is incorporated herein by reference for all purposes, which claims priority to People's Republic of China Patent Application 200910007218.9, entitled METHOD AND SYSTEM FOR IMAGE FEATURE EXTRACTION, filed Feb. 13, 2009, which is incorporated herein by reference for all purposes.

FIELD OF THE INVENTION

The present application relates to image processing technology, and in particular, to a method and a system for image feature extraction.

BACKGROUND OF THE INVENTION

In image processing, there are three main types of features that are extracted from images: color, texture, and shape. The focus of this application is on shape-based image feature extraction.

Image feature extraction is widely used in various fields. For example, in the field of image retrieval, a search engine provides pictorial-query services by comparing images in an image database with an image provided by a user, then returning an image from the image database which is most similar to the image given by the user. In such image retrieval systems, features of the images are compared; therefore, it is essential to perform feature extraction operations on those images in advance.

Typically, Hough transformation is used in shape-based image feature extraction and digital image processing. The Hough transformation maps a point in an image plane to a line in a parameter plane and extracts image features according to their statistical characteristics. The main idea of the Hough transformation is as follows: in the image space, a straight line can be represented by the equation $y=k*x+b$, with k being the slope parameter and b being the intercept parameter. Each straight line passing through the point $(x_0, y_0)$ has parameters that can be described as $y_0=k*x_0+b$. For a point in the target image plane (x, y) that meets a predetermined luminosity condition, a corresponding straight line in the (k, b) parameter plane can be obtained using the equation $b=y-k*x$. Each point on the straight line is assigned the value of one; and for a point where multiple such straight lines intersect, the point is assigned a value that is the number of the straight lines passing through that point. According to this procedure, a family of straight lines in the target image plane (x, y) can be obtained to represent a straight line in the (k, b) parameter plane. A point where these straight lines intersect in the (k, b) parameter plane has the highest value. Then, this point in the (k, b) parameter plane represents the straight line in the target image plane (x, y). Thus, using the procedure described above, a straight line in the plane can be detected by computing and finding a point having the highest value in the parameter plane. Multiple straight lines can be detected in the same manner. A similar approach can be used for circles and arcs.

Figure 1:
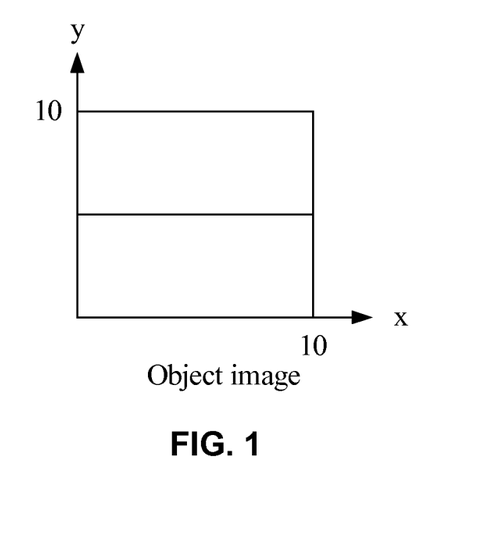
FIG. 1 illustrates an example of a target image using the conventional Hough transformation image feature extraction technique.

As an example, the conventional Hough transformation approach in image feature extraction is further illustrated using FIG. 1. The image in FIG. 1 has the size of 10*10 pixels. Using the bottom left corner of the image as the origin of the ordinate, a straight line in the image can be described by the equation $y=5$. Suppose that the background of the image has a lower luminosity and points on the straight line have higher luminosities. Using the Hough transformation, the straight line can be detected by the following procedure:

Step 1: detect each point of the image in FIG. 1 according to its coordinates.

Figure 2:
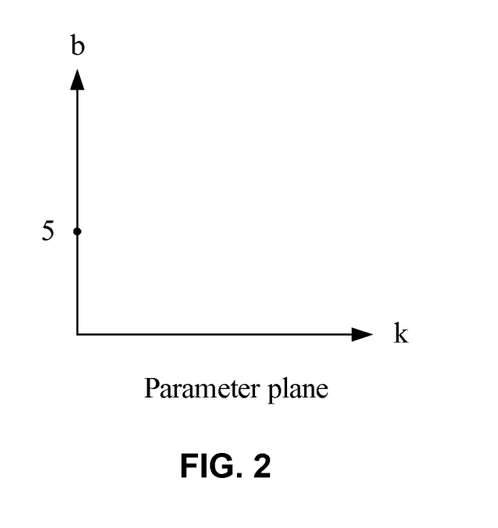
FIG. 2 illustrates an example of a parameter plane using the Hough transformation image feature extraction technique.

Step 2: if a point $(x_0, y_0)$ in the target image is detected to have a higher luminosity than a predetermined threshold, a straight line $b=y_0-k*x_0$ in the parameter plane (as illustrated in FIG. 2) is identified, then a value (i.e., a value) of one is assigned to each point on the straight line identified;

Step 3: for an intersection point of identified straight lines in the parameter plane, defining a value of the intersection point to be the number of straight lines passing through the point. Alternatively, a value of the intersection point may be defined as the sum of a values of the straight lines passing through the point.

As a result, for straight line $y=5$ in the target image in FIG. 1, a point in the parameter plane of FIG. 2 can be identified which has the highest a value and its parameters $k=0$ and $b=5$. Thus, the point (0, 5) in the parameter plane represents the straight line $y=5$ in the target image. And coordinate values 0 and 5 are the slope parameter and the intercept parameter, respectively. Therefore, the straight line $y=5$ in the target plane is detected by the point (0, 5) in the parameter plane.

Image feature extraction using the Hough transformation involves computing with floating-point numbers. For example, when compute the slope parameter of a straight line, floating-point computation is used. Even more complex floating-point computation is needed for circles and arcs. As is well known by those skilled in the art, floating-point computation poses greater demands on hardware, such as CPUs. As a result, the performance of the hardware is affected. More effective image feature extraction techniques are therefore needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer-readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term "processor" refers to one or more devices, circuits, and/or processing cores configured to process data, such as computer program instructions.

A detailed description of one or more embodiments of the invention is provided below, along with accompanying figures which illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 3A:
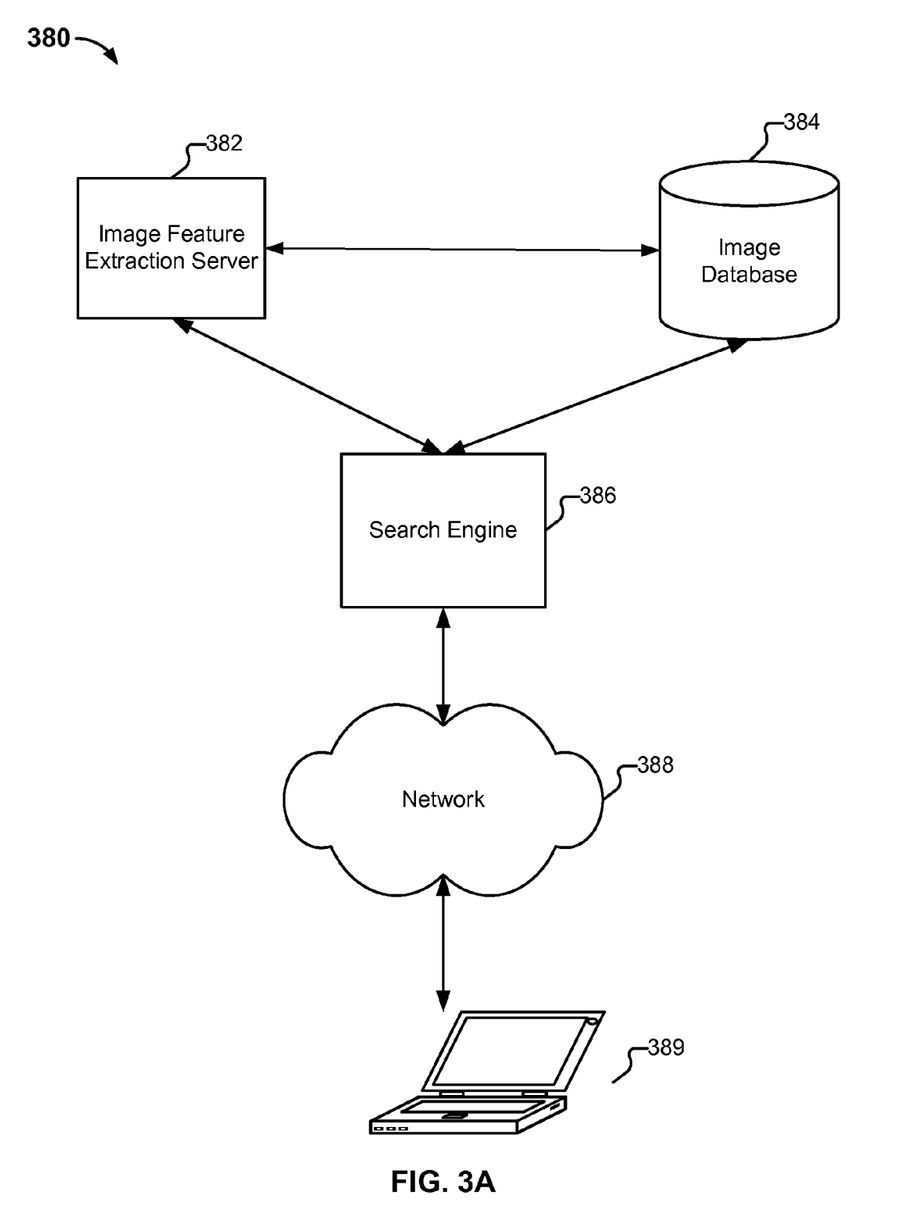
FIG. 3A is a block diagram illustrating an embodiment of an image feature extraction system.

FIG. 3A is a block diagram illustrating of an embodiment of an image feature extraction system. In the example shown, image feature extraction system 380 includes an image feature extraction server 382, which in some embodiments include one or more devices having one or more processors coupled to one or more memories. Image feature extraction server 382 includes one or more interfaces configured to receive user inputs; for example, user inputs sent by client devices such as 389 over a network 388, which may be the Internet or other communications network. Examples of a communication interface include, without limitation, external connections, such as a port, cable, wireline, or wireless network interface card, etc., and internal connections, such as a communication buses. In some embodiments, the client device is a computing device such as a computer or mobile device with networking capabilities. Image feature exaction server 382 has access to an image database 384 that stores images.

As will be described in greater detail below, upon receiving user input of an image, image feature extraction server 382 processes the image and extracts specific features of the image. In some embodiments, a search engine 386 searches the content of image database 384 according to the image features extracted by image feature extraction server 382, and an image as a search result is returned.

Figure 3B:
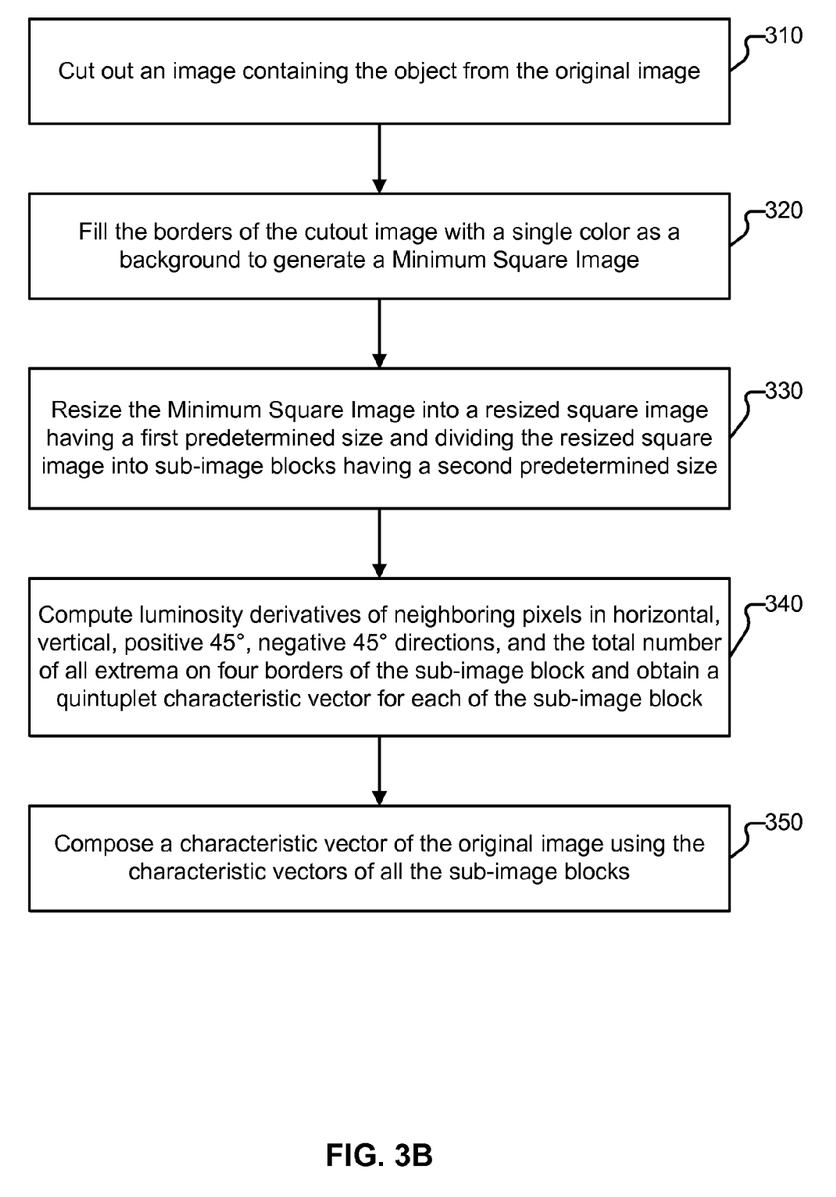
FIG. 3B is a flowchart illustrating an embodiment of an image feature extraction process.

FIG. 3B is a flowchart illustrating an embodiment of an image feature extraction process. The process may be performed on a system such as 380.

At 310, an image containing an object of interest is cut out from an original image.

Generally speaking, an original image contains not only an object of interest but also a background. The background is often at the periphery of the original image and the object is often at the center of the original image. Moreover, there is a significant difference in grayscale value between pixels of an edge of the object and pixels of the background. Therefore, the image containing the target image can be cut out from the original image, based on the difference between the grayscale values of the edges of the object and the background.

Figure 3C:
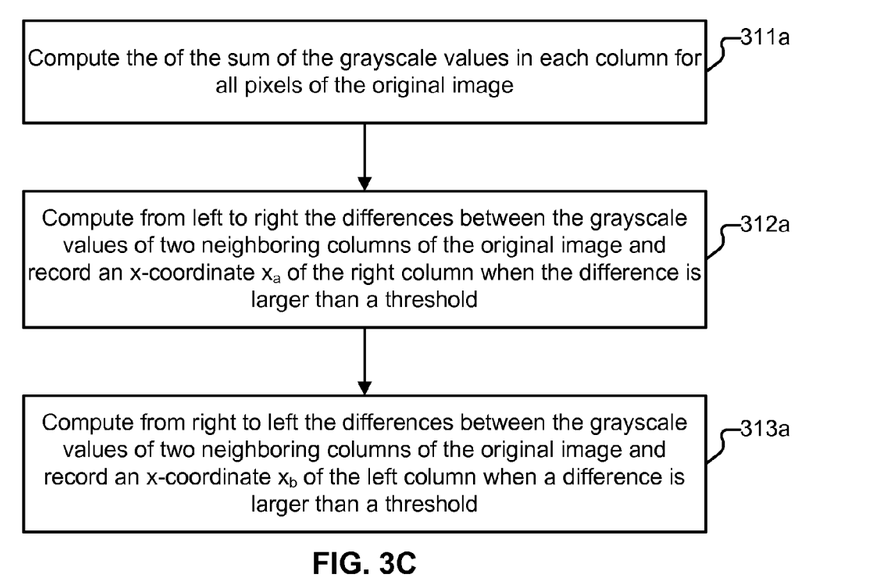
FIG. 3C is a flowchart illustrating an embodiment of a process to find the left and right borders of an object.

In some embodiments, multiple steps are used to detect borders of an object in an original image to facilitate cutting out the object. FIG. 3C is a flowchart illustrating an embodiment of a process to find the left and right borders of an object.

At 311a, the sum of the grayscale values in each column for all pixels of the original image is computed. For example, for a 10*10 pixel image, each pixel has a grayscale value. The sum of the grayscale values of all 10 pixels in each column is computed and defined as the grayscale value of this column. The column grayscale value may be stored in an array.

At 312a, the differences between the grayscale values of two neighboring columns of the original image are computed from left to right, and an x-coordinate ($x_a$) of the column on the right is recorded when the difference is larger than a threshold. For example, the grayscale values of all columns stored in the array from process 311a is scanned from left to right, and differences between neighboring values in the array are computed sequentially. When the scan reveals that the difference of the grayscale value between the second and the third column is 50, which is larger than a predetermined threshold value of 30, the x-coordinate $x_3$ of the third column is recorded, which corresponds to the index of the third element in the array. Thus, the left border indicating the position of the object in the original image is detected.

In an alternatively embodiment, when a scan reveals the difference to be larger than a threshold, the x-coordinate of the column on the left may be recorded. For example, when the difference between the grayscale values of the second column and the third column is 50, which is larger than the predetermined threshold 30, the x-coordinate $x_2$ of the second column may be recorded, which corresponds to the index of the second element in the array. There is no difference in performance between these two embodiments.

Similar to 312a, at 313a, the differences between the grayscale values of two neighboring columns of the original image are computed from right to left; and an x-coordinate $x_b$ of the column on the left is recorded when the difference is larger than a threshold. Therefore, the right border indicating the position of the object in the original image is detected.

The thresholds at 312a and 313a can be determined from experience. For example, if the borders of an object differ significantly from the background when the difference in grayscale value is larger than a certain value, the value can be used as the threshold.

Figure 3D:
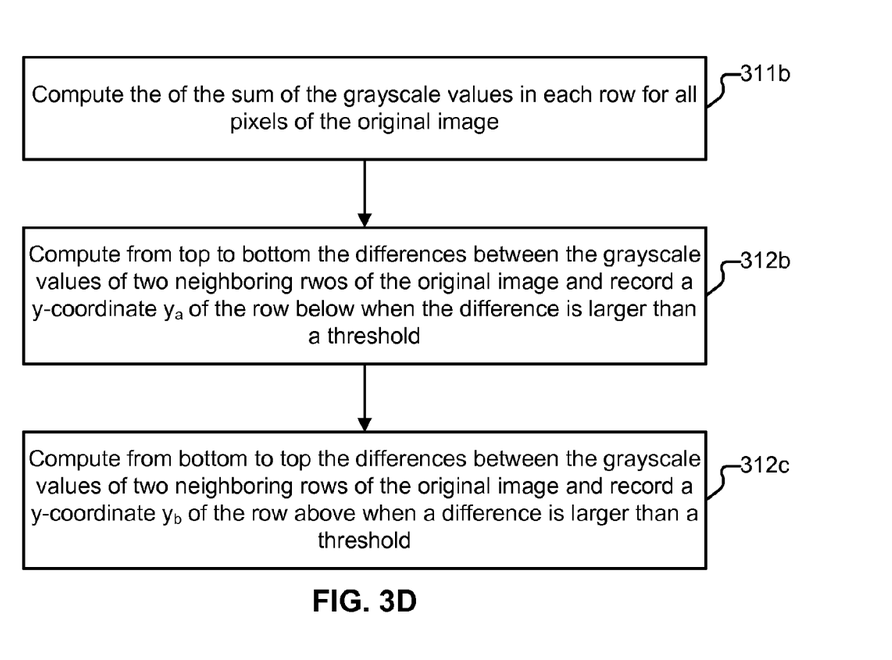
FIG. 3D is a flowchart illustrating an embodiment of a process to find the top and bottom borders of an object.

FIG. 3D is a flowchart illustrating an embodiment of a process to find the top and bottom borders of an object.

At 311b, the sum of grayscale values in each row for all pixels of the original image is computed. At 312b, the differences between the grayscale values of two neighboring rows of the original image are computed from top to bottom; and a y-coordinate $y_a$ of the row below is recorded when the difference is larger than a threshold. At 313b, the differences between the grayscale value sums of two neighboring rows of the original image are computed from bottom to top; and a y-coordinate $y_b$ of the row above is recorded when the difference is larger than a threshold.

Thus, the top and bottom borders indicating the position of the object in the original image are detected, with one being $y_a$ and the other being $y_b$.

Consequently, applying processes illustrated in FIG. 3C and FIG. 3D the rectangular image in the range of ($x_a$, $x_b$, $y_a$, $y_b$) is the cutout object image from the original image.

The foregoing embodiments cut out a rectangular image from the original image. It is simple and easy to use. In some embodiments, more complex processes of cutting out objects are used. For example, the grayscale value differences in two diagonal directions may also be computed. Therefore, the borders of the object in the two diagonal directions can then be detected. As a result, an octagonal cutout image containing the object in the original image can be detected. Similarly, a 16-gon, 32-gon, or 64-gon image cutout containing the object may also be obtained with additional directions.

In some embodiments, the original image may be horizontally divided into several sub-regions. The left and right borders of the object in each sub-region can be detected in the same manner as described above. Correspondingly, the original image may also be vertically divided into several sub-regions. The top and bottom borders of the object in each sub-region can also be detected in the same manner. Accordingly, a polygon cutout image containing the object can be obtained.

Returning to FIG. 3B, at 320, a square that has the shortest perimeter and contains the rectangular cutout image is obtained. It is referred to as a minimum square. The areas outside the borders of the cutout image and within the minimum square are then filled with a single color as the background. The single color may any RGB color. The color (0, 0, 0) is often used because it is simple and does not cause interference with the cutout image, making the subsequent computation of luminosity derivatives easier.

Figure 4A:
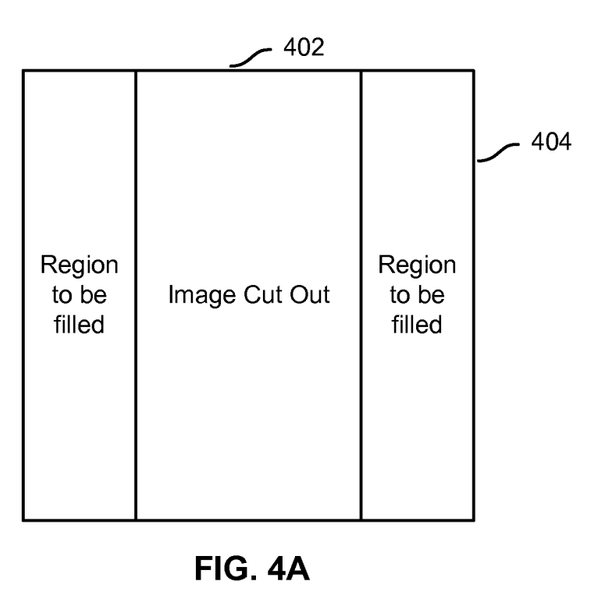
FIG. 4A is a block diagram illustrating an embodiment of a minimum square obtained by a process to fill a cutout image.

FIG. 4A is a block diagram illustrating an embodiment of a minimum square obtained by a process to fill a cutout image. 402 is the cut out image from the original image, and 404 is the minimum square.

The purpose of the single-color filling and Minimum-Square-obtaining of the cutout image is to make it easier to divide the cutout image containing the object into sub-image blocks having a predetermined size.

Returning to FIG. 3B, at 330 of FIG. 3B, the minimum square image is resized into a square image having a first predetermined size, then the resized image is divided into non-overlapping sub-image blocks having a second predetermined size.

For example, a minimum square image is resized into an image having 64*64 pixels or 128*128 pixels. In order to maintain the same length-to-width ratio of the cutout object, the minimum square is resized into a square of a first predetermined size. Then, the resized square image is divided into non-overlapping sub-image blocks having a second predetermined size, such as 16*16, 8*8, or 32*32 pixels. For instance, the first predetermined size may be 64*64 pixels and the second predetermined size may be 16*16 pixels; in this case the image including the object will be divided into 4*4 sub-image blocks.

The purpose of this process is to normalize the square image containing the object so that the subsequent processing of the image may be standardized and simplified. Both the first and the second predetermined sizes are preset. As long as the preset sizes are reasonable, no substantive difference is made.

In some embodiment, the resized image may be divided into overlapped sub-image blocks. However, although it is feasible, such division may increase the computational complexity and the dimensionality of the final output of the characteristic vector of the image.

Returning to FIG. 3B, at 340, the luminosity derivatives of neighboring pixels in horizontal, vertical, positive 45°, and negative 45° directions of the sub-image are computed. Thus, the characteristic vector of a sub-image block can be obtained.

A character vector of a sub-image block indicates the features of the sub-image block and it is defined by the numbers of extrema of the derivatives in the aforementioned four directions, and the total number of all extrema on the four borders of the sub-image block. The characteristic vector is a quintuplet vector in some embodiments, i.e., a vector with five elements, denoted as M (a, b, c, d, e). The quintuplet vector is initialized as M (0, 0, 0, 0, 0) in this example.

After the initialization, luminosity derivatives can be computed. A luminosity derivative is defined as "Luminosity Derivative=Luminosity Difference/Distance" between pixels. The value of luminosity may be obtained by a method known in the art, using the luminosity curve which describes the visual sensitivity of the human eye. In some embodiments, luminosity is calculated using L=116/3*(0.212649*R/255+0.715169*G/255+0.072182*B/255), with RGB being the color values. Normally, L=1 represents full luminosity, L=0 means dark, and a floating-point value in the range of 0~1 is mapped to an integer between 1 and 255. Therefore, a luminosity derivative represents the change of luminosity between pixels. In image feature extraction, edges or boundaries of an object in an image can be detected based on the fact that edges or boundaries of the object significantly differ from other portions of the image in terms of luminosity; therefore, the shape of the object in the image can be represented in a numerical manner.

The feature of an image can be described by the extrema of its luminosity derivatives. In particular, an extremum of the luminosity derivative is computed for all of the two neighboring pixels in a certain direction. In this process, a pixel is the extremum of the luminosity derivative if the sign of the luminosity derivative changes from its neighboring pixel. In a physical sense, the point where the extremum is located is usually an edge between the object and other parts of the image, or the shape feature of one part of the object that differs from the shape feature of other parts. Thus, these extrema can be used to describe the shape features of the object.

Figure 4B:
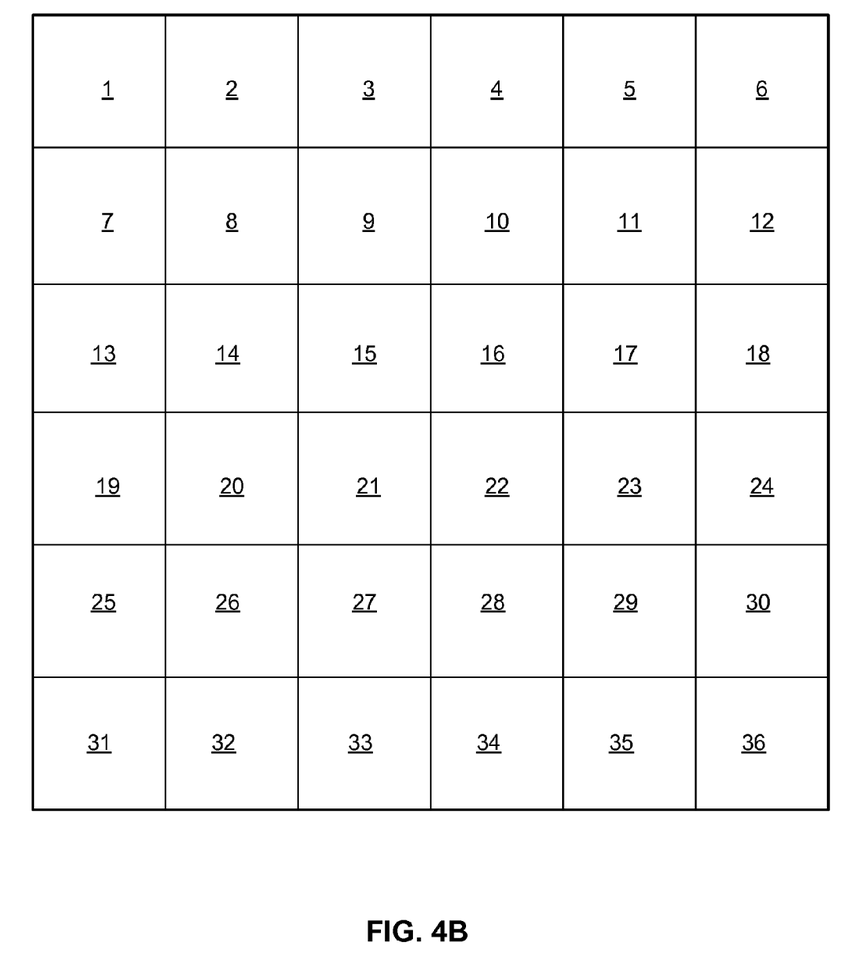
FIG. 4B is a block diagram illustrating an example sub-image block used in the luminosity derivative computation.

In some embodiments, the luminosity derivatives of neighboring pixels in horizontal, vertical, positive 45°, and negative 45° directions are computed. FIG. 4B is a diagram illustrating an example sub-image block used in the luminosity derivative computation.

First, the luminosity derivative in the horizontal direction is computed. Referring to FIG. 4B, luminosity derivatives of neighboring pixels (1, 2), (2, 3), (3, 4), etc., are calculated. In some embodiments, the luminosity derivative is simply the difference between the luminosity values of the neighboring pixels. If only one extremum of the luminosity derivative exists and it lies within the sub-image block, b is incremented by 1; if multiple extrema exist, b's value is equal to the number of the extrema; and if the extremum lies on the border of the sub-image block, a is incremented by 1. Here, the luminosity derivatives of pixels may be the luminosity derivatives of pixels in two neighboring columns.

Second, the luminosity derivative in the vertical direction is also computed. Referring to FIG. 4B, luminosity derivatives of neighboring pixels (1, 7), (7, 13), (13, 19), etc., are calculated. If one extremum of the luminosity derivative exists and lies within the sub-image block, c is incremented by 1; if multiple extrema exist, c's value is equal to the number of extrema; and if the extremum lies on the border of the sub-image block, a is incremented by 1. Here, the luminosity derivatives of pixels are the luminosity derivatives of pixels in two neighboring rows.

Third, the luminosity derivative in the positive 45° direction is computed. Referring to FIG. 4B, luminosity derivatives of neighboring pixels (2, 7), (3, 8), (4, 9), etc., are calculated. If one extremum of the luminosity derivative exists and lies within the sub-image block, d is incremented by 1; if multiple extrema exist, d's value is equal to the number of extrema; and if the extremum lies on the border of the sub-image block, a is incremented by 1. Here, the luminosity derivatives of pixels are the luminosity derivatives of pixels in the positive 45° direction.

Last, the luminosity derivative in the negative 45° direction is computed. Referring to FIG. 4B, luminosity derivatives of neighboring pixels (1, 8), (2, 9), (3, 10), etc., are calculated. If an extremum of the luminosity derivative exists and lies within the sub-image block, value 1 is added to e; if multiple extrema exist, e's value equals to the number of extrema; and if the extremum lies on the border of the sub-image block, value 1 is equal to a. Here, the luminosity derivatives of pixels may be the luminosity derivative of pixels in the negative 45° direction.

After the foregoing calculation, in the quintuplet vector corresponding to the sub-image block, a represents the number of times where a border of the object in the resized image lies on a border of the sub-image block; b represents the number of edges of the object in the sub-image block with the shape feature in the horizontal direction; c represents the number of edges of the object in the sub-image block with the shape feature in the sub-image block in the vertical direction; d represents the number of edges of the object in the sub-image block with the shape feature in the positive 45° direction; and e represents the number of edges of the object in the sub-image block with the shape feature in the negative 45° direction.

In various other embodiments, the values of a, b, c, d and e in the quintuplet vector representing the shape feature of the sub-image may be calculated differently in a different way.

At 340 of FIG. 3B, the quintuplet vector of each sub-image block is obtained. The vector represents the shape feature of each sub-image block. At 350 of FIG. 3B, the characteristic quintuplet vectors of all sub-image blocks are represented as one characteristic vector of the original image.

For example, an image having 64*64 pixels after step 320 is divided into 4*4 pieces of non-overlapping blocks having 16*16 pixels. Each quintuplet vector represents the shape feature of a sub-image block. Thus, for the 4*4 sub-image blocks, 16 quintuplet vectors are arranged to form an image characteristic vector with 80 elements, which represents the shape feature of the original image.

In some embodiments, the method may further include a normalization process. In one embodiment, the length and width of the cutout image from the original image are compared. If the length is larger than the width, the image is rotated clockwise by 90°. The purpose of rotation is to arrange all images in the same orientation. For example, the shape of a pen in a picture can be vertical or horizontal, but it is easier to compare the shapes of pens in different pictures if the pens in the picture all have the same orientation.

In another embodiment, the image may be rotated counter-clockwise.

In an alternative embodiment, the sum of the grayscale values of an upper half of the cutout image or the minimum square image and the sum of the grayscale values of a lower half of the cutout image or the minimum square image are compared. If the sum of the grayscale values of the upper half is larger than the sum of the grayscale values of the lower half, the cutout image or the minimum square image is inverted.

Similar to the rotation method described above, the inversion method is also used to normalize the orientation of the object contained in an image. For example, an upside-down apple is shown in an image; however, apples are upright in most pictures that contain apples. Therefore, in order to compare the picture with other pictures, the image with the upside-down apple should be inverted. For an object with a larger top and a smaller bottom, the sum of the grayscale values of the upper half of the image is larger than the sum of grayscale values of the lower half of the image; and conversely, for an object with a smaller top and a larger bottom, the sum of grayscale values of the lower half of the image is larger than the sum of grayscale values of the upper half of the image. Only integer computing is involved in this embodiment, and no floating-point computing is involved; therefore, the processing speed may be significantly improved using the same hardware configuration.

In practice, for a search engine that updates 1,000,000 images of products daily, the search engine needs to process 12 images per second, on average. That is, each image is processed within 100 ms without taking into account any overhead. Assuming a schedule of four hours each day for product updates, and considering the overhead of disk and network access, 50 images must be processed per second, with each complete image being processed within 20 ms. If the conventional Hough transformation is applied, approximately 20 ms will be needed to identify just the straight lines in an image having 200*200 pixels, using a standard quad-core server. Thus, there would not be enough time to perform Hough transformation for straight lines, let alone circles.

In contrast, using the various embodiments of the present application, which divides the image into blocks, the processing speed can be improved because floating-point computing is not involved. Moreover, existing multi-core processors are better suited to process divided images in parallel. Assuming an image of 200*200 pixels, all processing can be completed within 10 ms for the various embodiments of the application.

In some embodiments, the system processes multiple images and stores their corresponding characteristic vectors, the images, and any other relevant information such as information about products that corresponds to the images in the database. Upon receiving a request to determine whether a particular image is the same or similar to any images in the database, the characteristic vector of the image in question is looked up in the database. If a match is found, the image (or an identifier of the image) in the database with the matching characteristic vector is returned.

Figure 5:
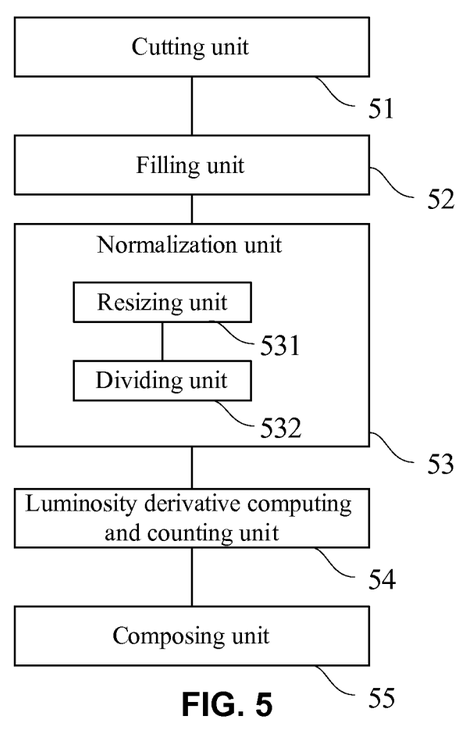
FIG. 5 is a block diagram illustrating an embodiment of an image feature extraction system.

FIG. 5 is a block diagram illustrating an embodiment of an image feature extraction system. As shown in the figure, the system includes:

a cutting unit 51, adapted to cut out an image containing an object from an original image;

a filling unit 52, adapted to fill the borders of the cutout image with a single color as the background such that the image after the filling is a minimum square;

a normalization unit 53 which includes a resizing unit 531 and a dividing unit 532, with the resizing unit 531 being adapted to resize the minimum square image into a square image having a first predetermined size, and the dividing unit 532 being adapted to divide the resized image into non-overlapping sub-image blocks having a second predetermined size; a luminosity derivative computing and counting unit 54, adapted to compute derivatives of the luminosity derivatives of neighboring pixels in horizontal, vertical, positive 45°, and negative 45° directions, and define a characteristic vector of a sub-image block by the respective numbers of extrema of the luminosity derivatives in the four directions, and the number of all extrema on four borders of the sub-image block; and a composing unit 55, adapted to compose the characteristic vectors of all sub-image blocks as one characteristic vector of the original image.

Figure 6:
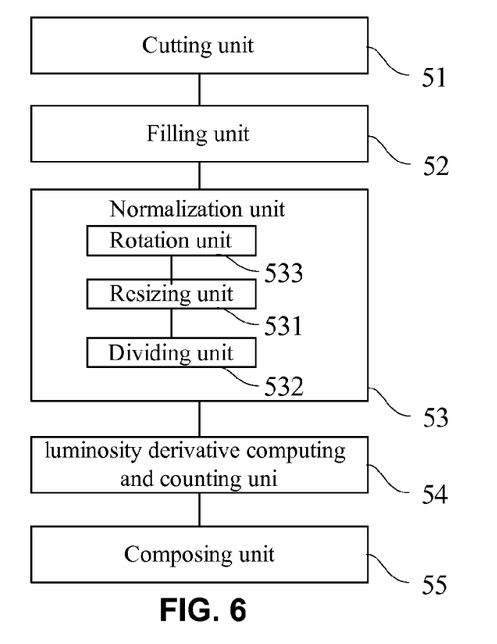
FIG. 6 is a block diagram illustrating an alternative embodiment of an image feature extraction system.

Preferably, in an embodiment of an image feature extraction system, the normalization unit 53 further includes a rotation unit 533, adapted to compare the length and the width of the cutout image, and rotate the image by 90° if the length is larger than the width, as illustrated in FIG. 6.

Figure 7:
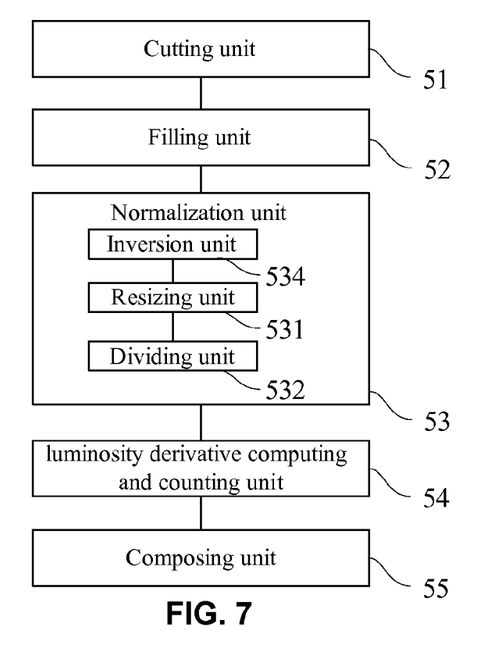
FIG. 7 is a block diagram illustrating an alternative embodiment of an image feature extraction system.

In another embodiment of the image feature extraction system, the normalization unit 53 may further include an inversion unit 534, adapted to compare the sum of grayscale values of an upper half of the cutout image with the sum of the grayscale values of a lower half of the cutout image, and invert the image after filling the cutout image if the sum of grayscale values of the upper half is larger than the sum of grayscale values of the lower half, as illustrated in FIG. 7.

Figure 8:
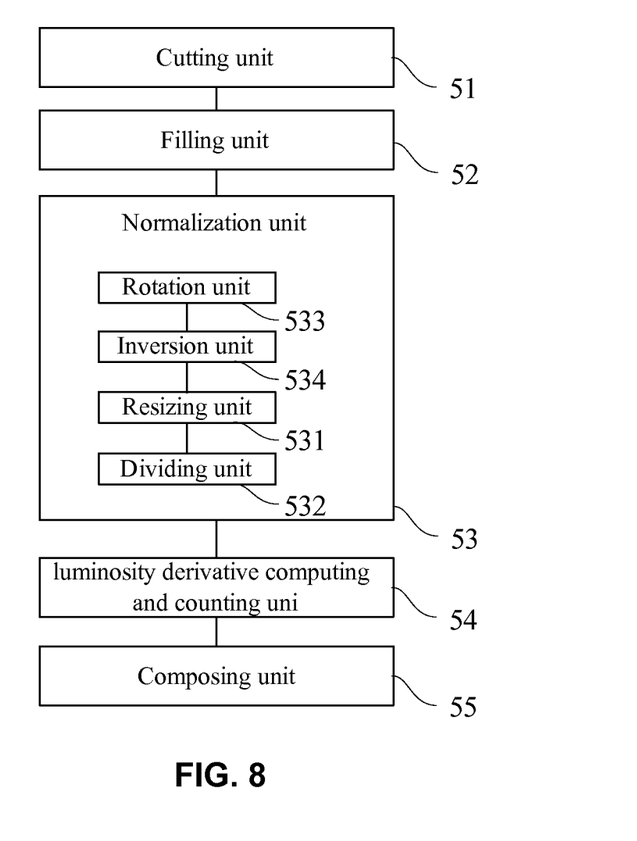
FIG. 8 is a block diagram illustrating an alternative embodiment of an image feature extraction system.

In another embodiment as illustrated in FIG. 8, the normalization unit 53 may include both the rotation unit 533 and the inversion unit 534 at the same time.

As discussed in the foregoing embodiments, the cutting unit 51 may cut out an image containing an object from an original image; in particular, it may cut out an image containing an object from the original image based on a significant difference in terms of grayscale values between an edge of the object and the background. The cutting process further includes:

computing the sum of the grayscale values in each column for all pixels of the original image; and computing the differences between the grayscale values of two neighboring columns of the original image from left to right, and recording an x-coordinate $x_a$ of the column on the right when the difference is larger than a threshold; and computing the differences between the grayscale value of two neighboring columns of the original image from right to left, and recording an x-coordinate $x_b$ of the column on the left when the difference is larger than a threshold;

computing the sum of the grayscale values in each row for all pixels of the original image; and computing the differences between the grayscale values of two neighboring rows of the original image from top to bottom, and recording a y-coordinate $y_a$ of the row below when the difference is larger than a threshold; and computing differences between the grayscale value of two neighboring rows of the original image from bottom to top, and recording a y-coordinate $y_b$ of the row above when a difference the larger than a threshold; and defining an image in the range of ($x_a$, $x_b$, $y_a$, $y_b$) as the image containing the object cut out from the original image.

As can be seen from the foregoing embodiments, a device or a system could include one or more memories, an interface configured to receive a user input; and with one or more processors, coupled to the interface, the processors is/are configured to cut out an image containing an object from an original image; fill the borders of the cutout image with a single color as the background such that a minimum square is obtained; resize the minimum square image into a square image having a predetermined size, and divide the resized image into non-overlapping sub-image blocks having a second predetermined size; then compute the luminosity derivatives of two neighboring pixels in horizontal, vertical, positive 45°, and negative 45° directions, and define the characteristic vectors of each sub-image block by the respective numbers of the extrema of the derivatives in the four directions and the total number of all extrema on the four borders of the sub-image block; then compose the characteristic vectors of all sub-image blocks as one characteristic vector of the original image. Thus, the shape features of images can be extracted using the above device/system configuration. Compared with the conventional art, the image processing speed can be significantly improved under the same hardware configuration because these processes involve only integer computation and no floating-point computation is needed.

Although preferred embodiments of this application have been described above, other variations and modifications can be made by one skilled in the art in the teaching of the basic creative conception. Therefore, the preferred embodiments and all these variations and modifications are intended to be contemplated by the appended claims.

Components of the image feature extraction system are described in different functional units. The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipments, etc.) implement the methods described in the embodiments of the present invention. The units may be implemented on a single device or distributed across multiple devices. The functions of the units may be merged into one another or further split into multiple sub-units.

From the above descriptions of the embodiments, those skilled in the art understand that the application can be implemented with software and at least a hardware platform. Therefore, this application may be in the form of a computer program product that is implemented on one or more computer-usable storage media (including, without limitation, magnetic disk storage, CD-ROM, and optical storage) containing computer-usable program codes.

The image feature exaction methods in this application can be applied in many all-purpose or dedicated computer systems or configurations, such as personal computers, servers, handsets, or other portable devices, tablets, multi-server systems, microprocessor-based systems, set-top boxes, programmable consumer electric devices, network PCs, small computers, super computers, and distributed computing environments with any one of the above systems or devices.

The embodiments of the application can be described in the context of computer-executable instructions executed by a computer, for example, a program module. Normally, the program module includes a routine, program, object, component, or data structure which performs certain functions or implements a particular abstract data type. The application may also be implemented in distributed computing environments, in which remote processing devices connected via communication networks are used to perform image feature extraction functions. In distributed computing environments, the program module may be located in local and remote computer storage media including the local storage device.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for performing imaging feature extraction, the extracted feature being used for image search, the method comprising:

extracting, using one or more computer processors, a cutout image that includes an object from an original image based on the differences of grayscale values between borders of the object and a background of the original image, wherein the extracting of the cutout image includes detecting, using the one or more computer processors, borders of the object based at least in part on computing a summing operation with respect to a plurality of pixels in the original image in one or more directions;

filling, using one or more computer processors, borders of the cutout image with a single color as a background to generate a minimum square image;

resizing, using one or more computer processors, the minimum square image into a resized square image having a first predetermined size;

dividing, using one or more computer processors, the resized square image into subimage blocks having a second predetermined size;

computing, using one or more computer processors, luminosity derivatives of neighboring pixels in horizontal, vertical, positive 45°, and negative 45° directions for the subimage blocks;

obtaining, using one or more computer processors, quintuplet characteristic vectors for the sub-image blocks; and forming, using one or more computer processors, an image characteristic vector of the original image using the quintuplet characteristic vectors.

2. The method of claim 1, further comprising comparing the image characteristic vector of the original image with a plurality of stored characteristic vectors that correspond to a plurality of stored images to identify a matching stored image.

3. The method of claim 1, wherein extracting the image further comprises:

computing the sum of grayscale values of a plurality of pixels in each column of the original image as the grayscale value of said each column;

recording the sum as the grayscale value of said each column;

computing from left to right differences between grayscale values of two neighboring columns of the original image;

recording an x-coordinate $x_a$ of the right column when the difference is larger than a threshold;

computing from right to left differences between grayscale values of two neighboring columns of the original image;

recording an x-coordinate $x_b$ of the left column when a difference is larger than a threshold;

computing the sum of grayscale values of a plurality of pixels in each row of the original image as grayscale value of said each row;

recording the sum as grayscale value of said each row;

computing from top to bottom differences between the grayscale values of two neighboring rows of the original image;

recording a y-coordinate $y_a$ of the lower of the two neighboring rows when a difference is larger than a threshold;

computing from bottom to top differences between grayscale values of the two neighboring rows of the original image and recording a y-coordinate $y_b$ of the upper of the two neighboring rows when a difference is larger than a threshold; and obtaining a cutout rectangular image with the range of ($x_a$, $x_b$, $y_a$, $y_b$) containing the object from the original image.

4. The method of claim 1, wherein filing the border of the image further comprises:

filling the cutout image with a color having the RGB value of (0, 0, 0) as the background.

5. The method of claim 1, wherein dividing the resized image further comprises:

dividing the resized image into non-overlapping sub-image blocks having a second predetermined size.

6. The method of claim 1, further comprising:

comparing a length and a width of the cutout image, and rotating the image clockwise by 90° if the length is larger than the width.

7. The method of claim 1, further comprising:

comparing a sum of grayscale values of an upper half of the cutout image and a sum of grayscale values of a lower half of the cutout image;

inverting the cutout image if the sum of the grayscale values of the upper half is larger than the sum of the grayscale values of the lower half.

8. The method of claim 1, further comprising:

comparing a sum of grayscale values of an upper half of the minimum square image and a sum of grayscale values of a lower half of the minimum square image;

inverting the cutout image or the minimum square image if the sum of the grayscale values of the upper half is larger than the sum of the grayscale values of the lower half.

9. The method of claim 1, wherein the grayscale values are integer values.

10. The method of claim 1, wherein the extracting of the cutout image includes detecting, using the one or more computer processors, borders of the object based at least in part on a sum of greyscale values of a plurality of pixels in one or more columns of the original image and a sum of greyscale values of a plurality of in one or more rows of the original image.

11. An image feature extraction system, the extracted figure being used for image search, the system comprising:

one or more processors configured to:

extract a cutout image that includes an object from an original image based on the differences of grayscale values between borders of the object and a background of the original image, wherein the extracting of the cutout image includes detecting, using the one or more computer processors, borders of the object based at least in part on computing a summing operation with respect to a plurality of pixels in the original image in one or more directions;

fill borders of the cutout image with a single color as a background to generate a minimum square image;

resize the minimum square image into a resized square image having a first predetermined size;

divide the resized square image into sub-image blocks having a second predetermined size;

compute luminosity derivatives of neighboring pixels in horizontal, vertical, positive 45°, and negative 45° directions for the sub-image blocks;

obtain a quintuplet characteristic vector for the sub-image block; and form an image characteristic vector of the original image using the quintuplet characteristic vectors of the sub-image blocks; and one or more memories coupled to the one or more processors and configured to provide the processor with instructions.

12. The system of claim 11, the one or more processors are further configured to compare the image characteristic vector of the original image with a plurality of stored characteristic vectors that correspond to a plurality of stored images to identify a matching stored image.

13. The system of claim 11, wherein to extract the cutout image further comprises to:

compute the sum of grayscale values of a plurality of pixels in each column of the original image as the grayscale value of said each column;

record the sum as the grayscale value of said each column;

compute from left to right differences between grayscale values of two neighboring columns of the original image;

record an x-coordinate $x_a$ of the right column when the difference is larger than a threshold;

compute from right to left differences between grayscale values of two neighboring columns of the original image;

record an x-coordinate $x_b$ of the left column when a difference is larger than a threshold;

compute the sum of grayscale values of a plurality of pixels in each row of the original image as grayscale value of said each row;

record the sum as grayscale value of said each row;

compute from top to bottom differences between the grayscale values of two neighboring rows of the original image;

record a y-coordinate $y_a$ of the lower of the two neighboring rows when a difference is larger than a threshold;

compute from bottom to top differences between grayscale values of the two neighboring rows of the original image and recording a y-coordinate $y_b$ of the upper of the two neighboring rows when a difference is larger than a threshold; and obtain a cutout rectangular image with the range of ($x_a$, $x_b$, $y_a$, $y_b$) containing the object from the original image.

14. The system of claim 11, wherein to fill the border of the image further comprises to:

fill the cutout image with a color having the RGB value of (0, 0, 0) as the background.

15. The system of claim 11, wherein to divide the resized image further comprises to:

divide the resized image into non-overlapping sub-image blocks having a second predetermined size.

16. The system of claim 11, wherein the one or more processors are further configured to:

compare a length and a width of the cutout image, and rotate the image clockwise by 90° if the length is larger than the width.

17. The system of claim 11, wherein the one or more processors are further configured to:

compare a sum of grayscale values of an upper half of the cutout image and a sum of grayscale values of a lower half of the cutout image; and invert the cutout image if the sum of the grayscale values of the upper half is larger than the sum of the grayscale values of the lower half.

18. The system of claim 11, wherein the one or more processors are further configured to:

compare a sum of grayscale values of an upper half of the minimum square image and a sum of grayscale values of a lower half of the minimum square image;

invert the cutout image or the minimum square image if the sum of the grayscale values of the upper half is larger than the sum of the grayscale values of the lower half.

19. A computer program product for performing imaging feature extraction, the computer program product being embodied in a non-transitory computer readable storage medium and comprising computer instructions for:

extracting a cutout image that includes an object from an original image based on the differences of grayscale values between borders of the object and a background of the original image, wherein the extracting of the cutout image includes detecting, using the one or more computer processors, borders of the object based at least in part on computing a summing operation with respect to a plurality of pixels in the original image in one or more directions;

filling borders of the cutout image with a single color as a background to generate a minimum square image;

resizing the minimum square image into a resized square image having a first predetermined size;

dividing the resized square image into sub-image blocks having a second predetermined size;

computing luminosity derivatives of neighboring pixels in horizontal, vertical, positive 45°, and negative 45° directions for the sub-image blocks;

obtaining a quintuplet characteristic vector for the sub-image blocks; and forming an image characteristic vector of the original image using the quintuplet characteristic vectors of the sub-image blocks.

20. The computer program product of claim 19, further comprising computer instructions for comparing the image characteristic vector of the original image with a plurality of stored characteristic vectors that correspond to a plurality of stored images to identify a matching stored image.

* * * * *

UNITED STATES PATENT AND TRADEMARK OFFICE
CERTIFICATE OF CORRECTION

PATENT NO. : 9,865,063 B2
APPLICATION NO. : 13/944677
DATED : January 9, 2018
INVENTOR(S) : Chunyi Zhou Page 1 of 1

It is certified that error appears in the above-identified patent and that said Letters Patent is hereby corrected as shown below:

In the Specification

In Column 2, Line 11, delete "(i.e., a value)" and insert --(i.e., α value)--, therefor.

In Column 2, Line 14, after "defining", delete "a" and insert --α--, therefor.

In Column 2, Line 16, after "Alternatively,", delete "a" and insert --α--, therefor.

In Column 2, Line 17, after "sum of", delete "a" and insert --α--, therefor.

In Column 2, Line 21, after "highest", delete "a" and insert --α--, therefor.

Signed and Sealed this
Twenty-second Day of May, 2018

Andrei Iancu
*Director of the United States Patent and Trademark Office*